INVENTORS
Carl Harry Knowles
Carl G. Tinsley
Robert W. Helda

ATT'YS.

July 28, 1964  C. H. KNOWLES ETAL  3,142,382
COMPREHENSIVE TESTING SYSTEM
Filed March 12, 1962  8 Sheets-Sheet 3

INVENTORS
Carl Harry Knowles
Carl G. Tinsley
Robert W. Helda
BY Mueller & Aichele
ATT'YS.

INVENTORS
Carl Harry Knowles
Carl G. Tinsley
Robert W. Helda
BY
ATT'YS.

July 28, 1964   C. H. KNOWLES ETAL   3,142,382
COMPREHENSIVE TESTING SYSTEM
Filed March 12, 1962   8 Sheets-Sheet 6

TO COMPUTER INPUT

INVENTORS
Carl Harry Knowles
Carl G. Tinsley
Robert W. Heida

BY

ATT'YS.

July 28, 1964   C. H. KNOWLES ETAL   3,142,382
COMPREHENSIVE TESTING SYSTEM
Filed March 12, 1962   8 Sheets-Sheet 7

INVENTORS
Carl Harry Knowles
Carl G. Tinsley
Robert W. Helda
BY
ATT'YS.

United States Patent Office 3,142,382
Patented July 28, 1964

3,142,382
COMPREHENSIVE TESTING SYSTEM
Carl Harry Knowles, Phoenix, and Carl G. Tinsley and Robert W. Helda, Scottsdale, Ariz., assignors to Motorola, Inc., Chicago, Ill., a corporation of Illinois
Filed Mar. 12, 1962, Ser. No. 179,112
12 Claims. (Cl. 209—75)

This invention relates generally to the electrical testing of circuit components and electronic devices, and relates particularly to an automatic system including a computer for sequentially testing semiconductor devices, such as transistors, and sorting them into categories based on their electrical parameters.

The electrical testing of transistors, and particularly transistors for high frequency and high speed switching applications, presents many problems to the transistor manufacturer. Such transistors are commonly classified into many different categories based on the electrical parameters of the individual devices. Substantial electrical differences exist among transistors of the same structural type. The electrical specifications for different categories of devices of the same general type usually span the normal parametric distributions of those devices. The electrical parameters of the transistors are measured and compared to the specifications, and the units are then sorted into the various categories. Testing and sorting equipment which is commercially available at the present time has not been capable of accomplishing this testing and sorting as effectively as desired.

One of the problems is that large quantities of transistors are sometimes used in a special application which requires that the transistor parameters be maintained within unusually stringent limits. The specifications for these special transistors may be somewhat different than the standard specifications for a volume production line, and unusual combinations of parametric values may be required. Consequently, it has sometimes been necessary to re-test a large number of transistors of one or more standard categories in order to supply an order for special devices. In some cases, it has been necessary to design additional test equipment in order to test unusual parameter requirements. It would be more desirable to have a testing system which is sufficiently flexible to test to unusual and even unexpected combinations of individual parameter specifications.

Another specific problem connected with high frequency transistors and high speed switching transistors is that certain important parameters are very difficult to measure accurately. For example, in order to test for switching times of the order a few nanoseconds, or current transfer ratios ($h_{fe}$) at frequencies of several hundred megacycles, it is necessary to minimize the resistance of the connections to the transistor leads and also to minimize series inductance and shunt capacitance associated with the lead connections. In order to accomplish this, the leads from the transistor to the test circuitry must be short, direct, and adequately isolated from each other. It is not satisfactory to use a fixed socket together with switching devices such as relays to connect each transistor sequentially to a series of parametric test stations. The best results are obtained when each transistor is physically moved from one test station to another and directly connected to the circuits at each test station.

A transport and connector system which is capable of automatically moving transistors from one test station to another, and which makes positive and direct electrical connections to the transistor leads at each test station with a minimum of spurious resistance, inductance and capacitance is described and claimed in a copending application of Robert W. Helda and Heinz R. Brueckner, Serial No. 100,463, filed on April 3, 1961, and assigned to the present assignee. The invention of that application can be used advantageously in the testing system to be described herein.

There are other problems of a more general nature connected with the comprehensive testing of transistors. A large volume of transistors must be handled at a minimum of cost. A typical transistor production line may have an output of tens of thousands of transistors per day. The testing and sorting of this output should cost no more than a few tenths of a cent per transistor. The testing system should be sufficiently flexible to accommodate changes in the specifications to which tests are made. In order to achieve good control over a transistor production operation, it is desirable to keep records of the parameter distributions which are obtained over a given period of time. If such records are available, it is possible to detect significant shifts in the parameter distributions and to adjust the production techniques in order to compensate for these shifts. A great deal of data is required to accomplish production control of this type, and presently available test equipment has not adequately supplied the required data.

In addition, the demand for the different device categories fluctuates considerably. This means that at one time a certain category may have top priority, and a few days or weeks later it may have a lower priority. It has been extremely difficult to maintain inventories of the various categories at levels which allow for these fluctuations in demand. It is clearly desirable to have a test system which will sort transistors preferentially in the order of their priority, and which will permit the priorities to be changed quickly and conveniently.

Therefore, it is an object of this invention to provide an automatic system for sequentially testing any desired number of electrical parameters of a circuit element, which system stores the results of each individual test until the entire sequence of tests is completed, and then classifies the circuit element in one or more electrical categories by comparing the composite test information with specifications which are also stored in the system. The storing of test results and specifications in the system offers many advantages, as will be described and makes is possible to physically move the circuit element from one test station to the next so that direct and positive connections to the lead portions of the elements can be made at each test station.

Another object of the invention is to provide a component testing system which includes an electronic computer that accomplishes the information storage functions and the classifying functions referred to above.

It is a further object of the invention to provide a computer-operated testing system which is capable of testing many parameters of transistors or other components, and which will physically sort the transistors on the basis of their parameters as compared to specifications, all accomplished rapidly and on an automatic basis such that the system will handle the output of a mass-production transistor manufacturing line.

Still another object of the invention is to provide a testing system which compares test information with specifications on a priority basis, and which permits the specifications and/or the priorities to be changed quickly and conveniently.

The automatic testing system of the invention accomplishes these and other objects, and yet permits the testing program to be carried out at a cost of only a few tenths of a cent per component, without requiring an excessive investment in equipment. A preferred embodiment of the invention for testing transistors includes the following sections or sub-systems:

(1) A mechanical transport and connector system.

(2) A series of test modules provided at stations along the transport and connector system where the connector devices of that system are located.

(3) An encoding system for each test module which converts analog test information to digital form and converts the digital information to binary form.

(4) A scanning system.

(5) An electronic computer which receives the binary information from the encoders through the scanner, and which supplies an output in binary form containing the transistor classification information.

(6) A decoding system which converts the binary classification information to digital form.

(7) A sorting system which physically sorts the transistors into receptacles in accordance with the classification information.

A testing system of this type is illustrated in the accompanying drawings, in which.

Each of the sub-systems referred to above will be described fully. The overall system and its operation will be described first in order to point out the cooperation between the various sub-systems and the manner in which transistors are tested by the system as a whole. Circuits for individual sub-systems will then be described.

THE OVER-ALL TEST SYSTEM

Figure 1:
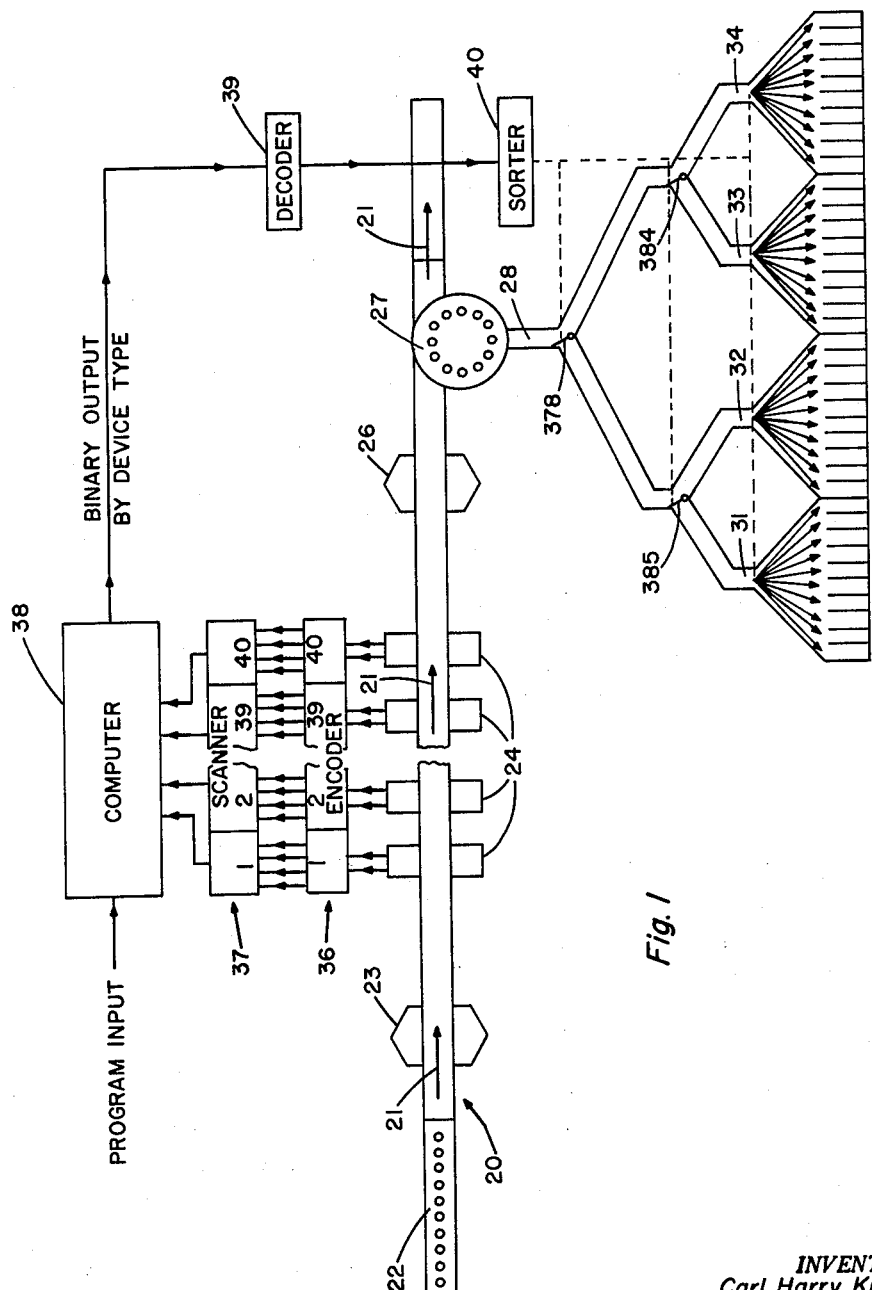
FIG. 1 is a schematic drawing in block form of the entire testing system.

FIG. 1 is a block diagram of the testing system which shows the path followed by the transistors which are being tested and sorted, and also the paths of the test information and the classification information which controls the sorting of the transistors. The system includes a mechanical transport section 20 which carries the transistors along a path indicated by the arrows 21. In the illustrated embodiment of the invention, the transistors ride on carrier boards which are driven along a track in a step-by-step fashion. The boards are loaded on the track at a board loading station 22. Transistors are placed on the boards at a transistor loading station 23, and this may be accomplished automatically. When the system is operating at full capacity, there is a continuous chain or series of transistors progressing down the track, and the transistors are equally spaced along the track at any given time. The station 23 may also include equipment for positioning the leads of the transistors so that they will be oriented properly when they reach the test stations of the system.

Several test stations 24 are provided along the track of the mechanical transport section 20. Only four test stations 24 are shown in FIG. 1, but there may be as many test stations as desired. In a typical embodiment of the invention, there are forty test stations, each of which makes a different test. Each test station 24 includes an automatic connector device, and a test module which contains the circuitry for measuring a particular electrical parameter of the transistor. As previously mentioned, the transistors move in a step-by-step fashion, and the spacing of the transistors is such that when they are at rest, there will be one transistor at each of the forty test stations 24. The automatic connector devices are of a type which close on the leads of the transistors to establish electrical contact to those leads, and then retract after a test has been made so that the transistors can be moved another step along the track. Typically, the transistors progress at the rate of about one step per second. The mechanical functions of indexing the transistors, closing and retracting of the connectors, and locking and unlocking the carrier boards at the test positions, all take place in about .6 of a second. The mechanical transport and connector system is described and claimed in the copending application of Robert W. Helda and Heinz R. Brueckner identified above, and that application may be referred to for further information on the construction of this sub-system.

Figure 4:
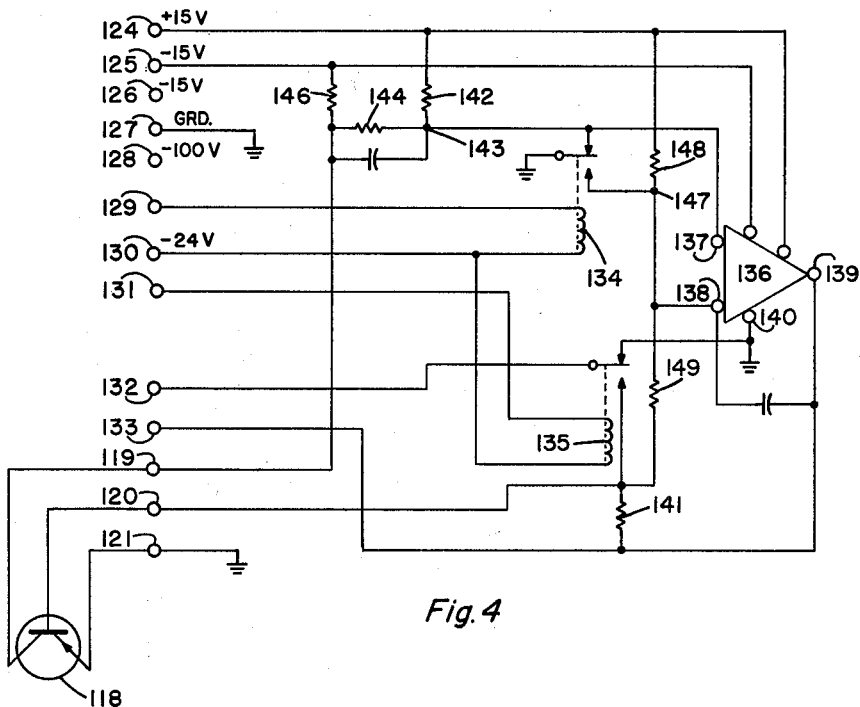
FIG. 4 is a circuit diagram of a test module which measures the current gain of a transistor.
Figure 5:
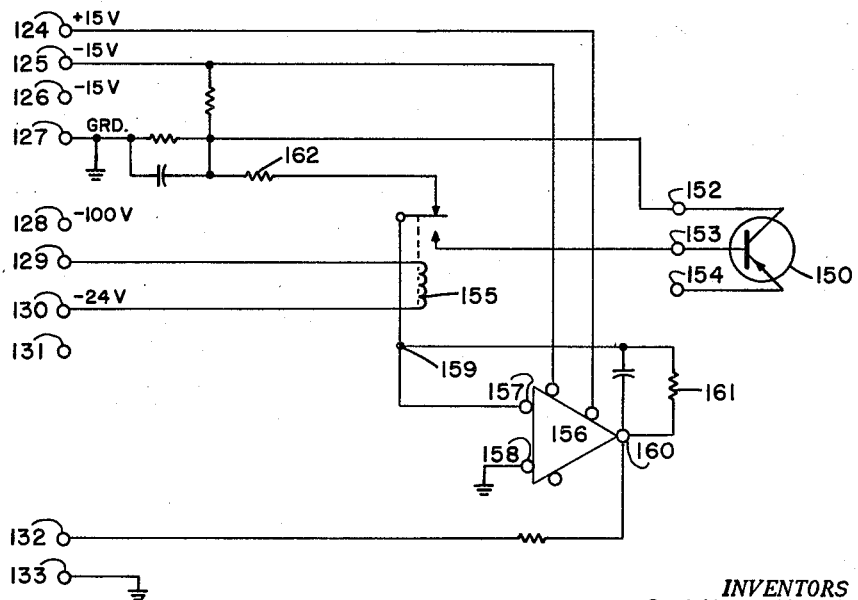
FIG. 5 is a circuit diagram of a test module which measures the reverse leakage current of a transistor.

The test stations 24 have circuits for testing various parameters of the transistors. It is the function of these circuits to convert the particular parameter being tested into a direct current voltage which is proportional to the test reading. These circuits may be provided in modules, and will sometimes be referred to as test modules herein. The circuits of two typical test modules are shown in FIGS. 4 and 5 by way of example.

From the test stations, the transistors are transported to a station 26 at which the leads of the transistors are positioned so that they are parallel to each other. The transistors are unloaded from the track at another station 27, and they are dropped into a main chute 28 associated with a sorter 40. The chute 28 divides into four branch chutes and these lead to four sections 31, 32, 33 and 34, each of which includes ten bins. Each transistor is classified into one of forty categories and is placed in a bin which corresponds to this category. Solenoids in the main chute 28 and the branch chutes are controlled by the classification information to direct each transistor into the proper bin. It should be understood that the number of categories or bins and the number of tests need not be the same, although in this particular embodiment there are forty test stations and also forty bins.

The encoder 36, the scanner 37, the computer 38, the decoder 39 and the sorter 40 are the information processing sections of the system. The over-all function of these sections or sub-systems is to evaluate the tests that are made at the test stations 24, and based on this evaluation, to control the sorting of the transistors into the forty bins. The manner in which information is processed and fed into the computer will be described with reference to FIGS. 1 and 2, and then the processing of the information which comes out of the computer will be described with reference to FIGS. 1 and 3.

Figure 2:
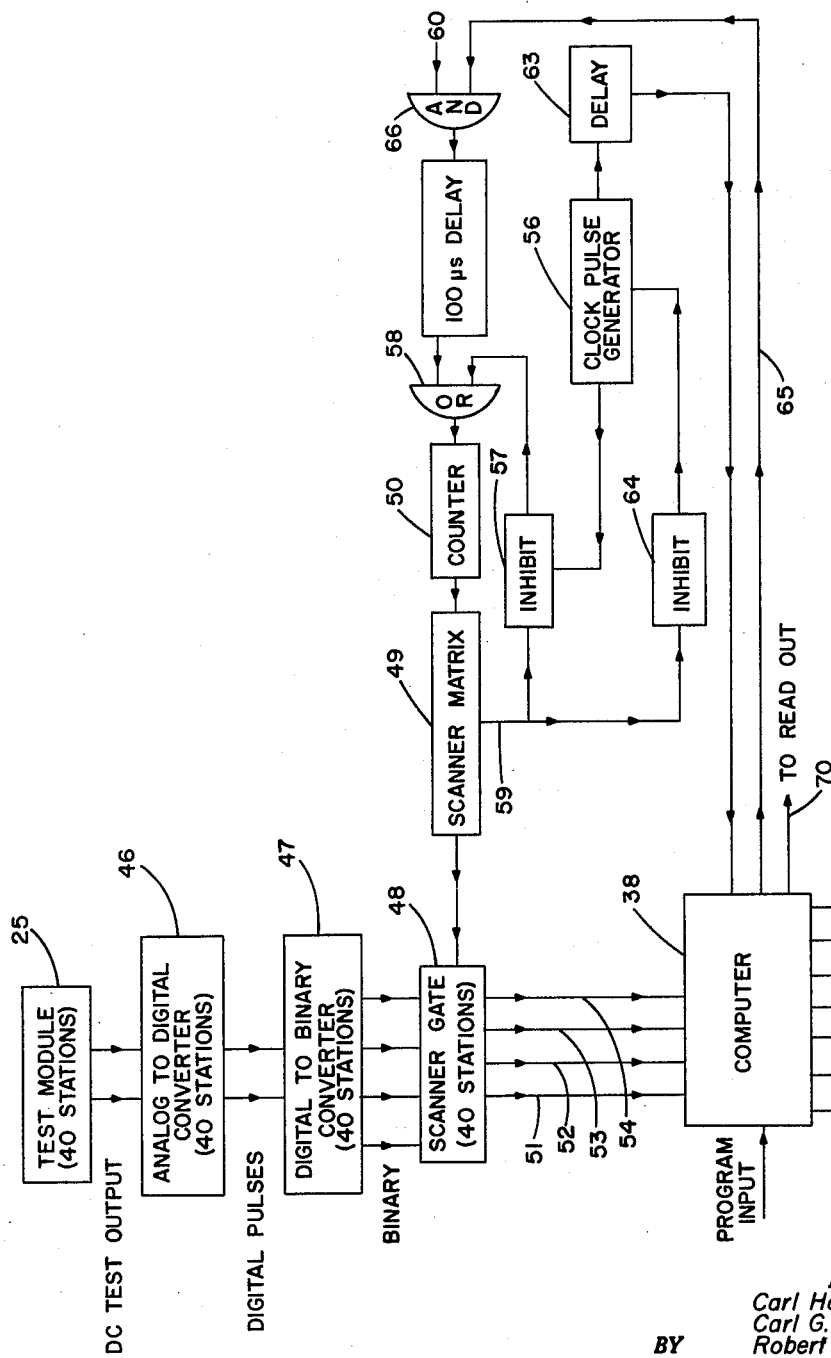
FIG. 2 is a schematic drawing showing in block diagram form, the computer and the major electrical portions of the test system which prepare the test information and deliver it in usable form to the computer.

FIG. 2 illustrates in block diagram form the encoding and scanning circuitry associated with one of the test modules 25. The encoder 36 of FIG. 1 includes an analog-to-digital converter 46 and a digital-to-binary converter 47 associated with each test module 25, as shown in FIG. 2. The binary output from the converter 47 is transferred by a scanner gate 48 to four input lines 51, 52, 53 and 54 which lead to the computer 38. There are two converters 46, 47 and a scanner gate 48 for each of the forty test modules of the system of FIG. 1. The forty scanner gates are actuated sequentially to transfer information from the converters to the four input lines 51, 52, 53 and 54 of the computer. The sequential operation of the scanner gates is provided by the scanner matrix 49 and the counter 50, as will be further described.

Each test module 25 provides a D.C. voltage of a level which is proportional to the parameter that is measured by that particular module. The analog-to-digital converter 46 detects the level of the voltage supplied to it from the test module, and supplies a series of pulses to the converter 47. The converters 46 and 47 are shown in detail in FIG. 6. The number of pulses in this series represents a voltage range which includes the particular level of the D.C. voltage supplied by the test module. For example, the over-all range of D.C. voltage may be from 0 to 8 volts. This voltage range is divided into eight smaller consecutive ranges, and the limits of these ranges are represented by reference voltages applied as biasing potentials to certain transistors which are included within the converter 46. The number of pulses supplied by these transistors indicates which of the eight different voltage ranges the D.C. voltage falls within. This information, in turn, indicates which of eight different ranges the measured parameter falls within. For example, if the output of the converter 46 consists of seven pulses, the D.C. test voltage comes within the eighth voltage range and the measured parameter comes within the eighth range of that parameter.

It should be noted that any given parameter may be divided into as many ranges as desired. The number of ranges together with the number of tests which are made determines the maximum sorting capacity of the system. The illustrated embodiment makes forty different tests and each test has eight ranges, so it would be theoretically possible to sort the transistors into $8^{40}$ different categories. As previously mentioned, the illustrated system sorts into only forty of these categories, but either more categories or less categories may be used if desired. As a practical matter, it has not been necessary to sort to more than forty categories.

Figure 6:
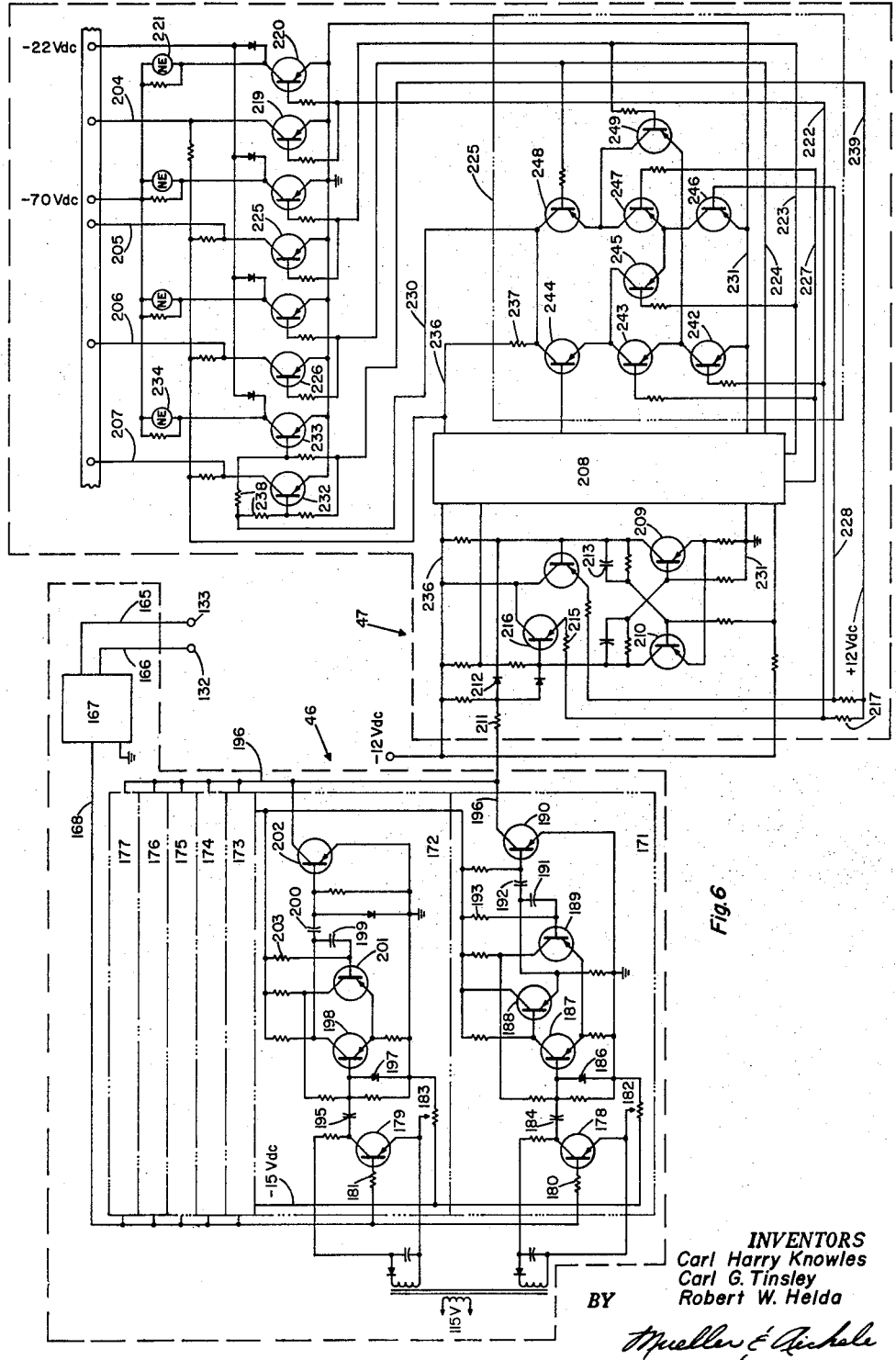
FIG. 6 is a circuit diagram of the encoder of the test system.

The digital information represented by the pulses from the converter 46 is translated into binary form by the other converter 47. The converter 47 as shown in FIG. 6 includes a three-bit binary counter 208, a parity generator circuit 225 and an output indicating circuit shown at the upper right-hand corner of FIG. 6. The counter circuit is shown within and to the left of block 208 of FIG. 6. The counter has three stages, and since it has a count capacity of $2^3$, it provides eight possible combinations of output voltages. Each counter stage of this particular circuit provides a first output, identified binary one, at a level of 0 volts, and a second output, identified binary zero, at a level of −12 volts.

The parity generator circuit is shown at 225 in FIG. 6, and will be described later. The purpose of the parity generator circuit is to provide information which will enable the computer 38 to detect any improper operation of the encoding circuitry. This is accomplished by causing the parity generator circuit to supply a voltage representing binary one to the computer input line 54 (FIG. 2) whenever there is an even number of binary one voltages on the other three computer input lines 51, 52 and 53. Thus, if the encoding system is operating properly, there will always be an odd number of binary one voltages delivered to the computer input lines.

The counter of the converter 47 (FIGS. 2 and 6) simply counts the pulses supplied to it from the other converter 46. The binary coding of the outputs from the counter and the parity generator circuit 225 as they are delivered to the computer input lines 51, 52, 53 and 54 (FIG. 2) is shown in Table I below.

Table 1

| Count | 0 | 1 | 2 | 3 | 4 | 5 | 6 | 7 |
|---|---|---|---|---|---|---|---|---|
| Line 51 | 0 | 1 | 0 | 1 | 0 | 1 | 0 | 1 |
| Line 52 | 0 | 0 | 1 | 1 | 0 | 0 | 1 | 1 |
| Line 53 | 0 | 0 | 0 | 0 | 1 | 1 | 1 | 1 |
| Line 54 (Parity) | 1 | 0 | 0 | 1 | 0 | 1 | 1 | 0 |

This binary information is stored temporarily by the converter 47 and is transferred by the scanner gate 48 (FIG. 2) to the computer input lines when the gate is actuated by the scanner matrix 49. The matrix 49 supplies actuating signals sequentially to each of the forty scanner gates, and thus the forty test outputs, coded in binary form, are supplied sequentially to the computer 38. The scanner matrix 49 is controlled by a six-bit counter 50 which counts pulses supplied to it from a clock-pulse generator 56. In this example the clock-pulse generator operates at a 10 kilocycle rate, and it is of the free-running type. The clock pulses are supplied to an inhibit circuit 57 which is controlled by the scanner matrix 49. When the counter 50 is in the reset condition, a signal appears on line 59 which causes the inhibit circuit 57 to block the clock pulses so that they cannot reach the counter 50.

The counting cycle is initiated by a signal from an AND gate 66 which causes the counter to register a count of one. The AND gate 66 is actuated to start the count when it receives a signal on line 60 and a signal on line 65. The signal on line 60 indicates that a test has been completed at the forty test modules 25, and the signal on line 65 indicates that the computer 38 is ready to receive the test information over lines 51–54. When the counter is actuated by the AND gate 66, the inhibit signal is removed from line 59 because the counter is no longer in the reset condition. The inhibit circuit 57 then allows clock pulses to pass to the counter which causes it to step through its counting cycle and sequentially energize the forty gate energizing lines leading from the scanner matrix 49 to the scanner gates 48. When the counter reaches a count of 41, it generates a reset signal which returns it to the reset condition. The resetting of the counter causes the inhibit signal to reappear on line 59, thus blocking the clock pulses again.

During the counting cycle, clock pulses are also supplied through the delay circlit 63 to the computer 38, and the flow of these pulses is controlled by the inhibit circuit 64. The action of circuit 64 is the same as that described above in connection with the other inhibit circuit 57. These pulses serve to synchronize the input portion of the computer with the scanner.

It may be seen from the foregoing description that for each transistor, the test information which goes into the computer 38 is a forty-digit number coded in binary form, with each digit having eight possible levels. Specifications for the forty different categories into which the transistors are sorted are stored in the computer in a binary coded form. Each such specification has an upper limit and a lower limit for each parameter of that specification, except in some cases there is a lower limit only and in other cases there is an upper limit only. One forty-digit number defines the over-all lower limit of the specification, and another forty-digit number defines the over-all upper limit of the specification. These specification digits are stored in the computer in binary form, and each forty-digit test input is compared against the specifications by the computer 38.

These comparisons are made within the computer on the basis that a specification is not met if *any digit* of the forty-digit test input falls outside the limiting profile, regardless of what happens in any other digit positions. If any digit of the test input is beyond its corresponding limit, a condition is generated within the computer which indicates that the specification is not satisfied. When none of the digits of the test input are beyond their corresponding limits, a different condition is generated within the computer which indicates that the particular specification is satisfied.

Each specification stored within the computer has a priority assigned to it, and by making the comparisons described above, the computer provides an output which corresponds to the one specification having the highest priority that is satisfied. This output contains the classification information which causes the transistor to be sorted into one of the forty bins of the sorter 40.

There are alternative ways of programming the computer to accomplish this classifying function on a priority basis. The computer may be programmed to compare the test information with the specifications starting with the highest priority specification and continuing in the order of their priorities. Thus, the first specification that is satisfied will have the highest priority, and this information is stored in the computer. If desired, the program can be designed so that the computer will continue making comparisons and keep a record of all of the lower priority specifications which are also satisfied by the transistor. Thus, the computer may provide output information for record purposes showing how many transistors have been classified into each category and also how many transistors of each category also passed the specifications for one or more of the other categories.

A very desirable feature of the system is that yield and distribution data for potential specifications can be obtained, and one or more of these potential specifications can be added to the program at any time. For example, the computer has been programmed successfully to sort forty categories and provide additional read-out information at output 70 (FIG. 2) which indicates how many transistors have been sorted into each category and in addition how many transistors of each category also satisfied one or more of the potential specifications. The number of potential specifications which can be added to the classifying program depends on the speed and capacity of the computer. In a specific example, the system has been operated to test and sort to forty categories, and provide yield and distribution data for eight potential specifications. As one possible alternative, the system has been programmed to test and sort to twenty categories, provide yield and distribution data for each of these categories, and also provide yield and distribution data for four potential specifications.

It is possible to operate more than one testing and sorting line using a single computer to accomplish the classifying function for all lines. The number of lines which can be operated from a single computer depends, of course, on the speed and capacity of the computer. The ability to add testing lines to the system means that the system can be expanded to test additional devices or new types of devices with less investment in equipment than that required for the first line.

Computers which will accomplish the classification function just described are commercially available. These are general purpose digital computers, and they can be programmed in a wide variety of ways and will accept the programs described above. A transistorized computer having a random access magnetic core memory with a 20,000 decimal digit capacity has been used successfully in the testing system of the invention. A computer of this type is available under the trade-name IBM 1620. Another satisfactory computer is available under the trade-name GE 225. The particular circuits illustrated herein are suitable for use with an IBM 1620 computer.

The classification information output is supplied from the computer as a two-digit number coded in binary form. For example, if the particular specification having top priority is met by a given transistor, the output of the computer will be the two-digit number 00. If the specification having the eleventh priority is met, the output of the computer will be the two-digit number 10. If none of the specifications are met, the output will be 39, so this last category is for reject transistors.

The classification information is supplied from the computer 38 in binary form on five output lines 71 through 75 (FIG. 2). A typical coding scheme for this information is shown in Table II.

*Table II*

| Digits | 0 | 1 | 2 | 3 | 4 | 5 | 6 | 7 | 8 | 9 |
|---|---|---|---|---|---|---|---|---|---|---|
| Line 71 | 1 | 0 | 0 | 0 | 0 | 0 | 0 | 0 | 0 | 0 |
| Line 72 | 0 | 1 | 0 | 1 | 0 | 1 | 0 | 1 | 0 | 1 |
| Line 73 | 0 | 0 | 1 | 1 | 0 | 0 | 1 | 1 | 0 | 0 |
| Line 74 | 0 | 0 | 0 | 0 | 1 | 1 | 1 | 1 | 0 | 0 |
| Line 75 | 0 | 0 | 0 | 0 | 0 | 0 | 0 | 0 | 1 | 1 |

Figure 3:
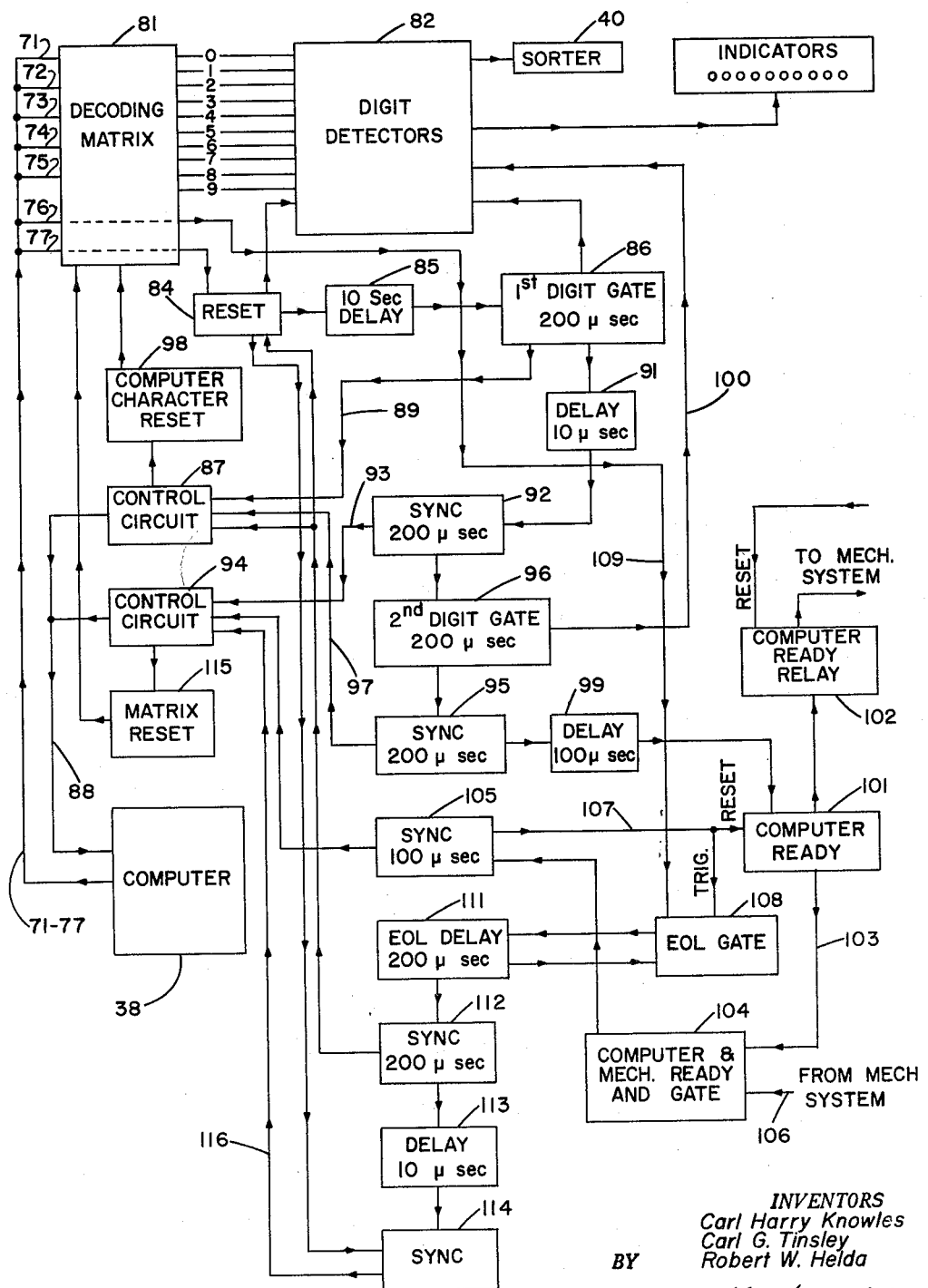
FIG. 3 shows in block diagram form, the electrical circuits which process the device classification information which is delivered from the computer.

The decoding of this binary information will be described with reference to FIGS. 1 and 3. A decoding matrix 81 (FIG. 3) receives the binary information from the computer 38 over lines 71–75. There are ten output lines numbered 0 to 9 leading from the matrix 81 to the digit detectors 82, and these lines correspond to the decimal digits of Table II. The matrix output line number 3, for example, will be energized when lines 72 and 73 each receive a binary one. Matrix output line number 7 will be energized when matrix input lines 72, 73 and 74 each receive a binary one and lines 71 and 75 receive a binary zero. In a specific circuit embodiment, binary one information is represented by zero volts and binary zero is represented by plus forty-eight volts.

When the computer 38 is ready to supply an output, the first-digit classification information is applied to lines 71–75 and concurrently a "start" signal is applied to line 77. The "start" signal is ordinarily used for "punch feed" purposes in other applications of the computer where the output information is applied to a mechanism which punches holes in a tape. However, in the testing system of the invention, the "start" signal is used for reset and synchronizing purposes. The "start" signal is applied to a reset circuit 84 which causes the digit detector circuits 82 to be reset. A synchronizing signal is generated within the reset circuit 84 and applied through a 10 microsecond delay circuit 85 to a first-digit gate circuit 86. This gate applies a signal to the digit detectors 82 which puts them in a condition to respond to the first-digit information.

The first-digit information is received by the decoding matrix 81 in binary form, and the matrix decodes this information and energizes one of the matrix output lines numbered 0 to 3 inclusive. This causes the digit detector 82 to actuate the first-digit solenoid drivers of the sorter 40 so that the sorter will direct the transistor into one of the four sections 31 through 34 shown in FIG. 1. The first digit gate 86 applies a signal on line 89 to a control circuit 87 which in turn supplies a synchronizing signal to the computer 38 over line 88. This synchronizing signal causes the computer to remove the first-digit of the classification information from the memory section of the computer. The control circuit 87 also actuates a character reset circuit 98 which serves to clear the output information holding circuits within the computer which feed lines 71 through 75. At the end of a 200 microsecond delay, the first-digit gate 86 supplies a signal through a 10 microsecond delay circuit 91 to a synchonizing circuit 92 which then applies a signal on line 93 to another control circuit 94. The control circuit 94 supplies a signal over line 88 to the computer 38 which causes the computer to transfer the second-digit binary information to lines 71–75.

The control circuit 94 also actuates the matrix reset circuit 115 which in turn puts matrix 81 in the proper condition to receive the second-digit information. The second-digit gate circuit 96 is actuated at this time by a delayed signal from the sync circuit 92, and the gate 96 applies a signal over line 100 to the digit detectors 82 which puts these detectors into the proper condition to respond to the second-digit information.

The decoding matrix 81 converts the binary information on lines 71 to 75 into digital form and actuates one of the matrix output lines numbered 0 to 9 inclusive. The particular line which is energized causes one of the second-digit detector circuits 82 to actuate the second-digit solenoids of the sorter 40 so that the transistor will be directed into one of the ten bins of one of the sections 31–34. This completes the sorting action of the system for that particular transistor.

After a 200 microsecond delay, the second-digit gate 96 actuates a synchronizing circuit 95. The sync circuit 95 supplies a signal of 200 microseconds duration over line 97 to the control circuit 87 which removes the second-digit binary information from the memory section of the computer. The control circuit 87 also actuates the character reset circuit 98 which clears the output information holding circuits of the computer and thus takes the second-digit information off lines 71–75.

The sync circuit 95 also applies a signal through the 100 microsecond delay circuit 99 to a computer ready circuit 101. The ready circuit 101 serves an interlock function between the computer and the mechanical transport system. The transport system will wait for the computer if it should get ahead of the computer from a timing standpoint. The computer ready circuit will send a signal to a relay 102 when the computer is ready, and the relay will then release the mechanical transport system so that it can proceed. When the computer ready circuit 101 is actuated by the signal from the synchronizing circuit 95, it supplies a signal on line 103 to a gate circuit 104. The gate circuit 104 will in turn actuate a synchronizing circuit 105 when the gate 104 receives a signal from the mechanical system over line 106. The synchronizing circuit 105 supplies a signal of 100 microseconds duration to the control circuit 94. This control circuit in turn applies a signal over line 88 to the computer which causes the computer to apply a signal to the computer output line 76 which indicates the end of a line of classification digit information. The control circuit 94 also actuates the matrix reset circuit 115 which in turn puts the matrix 81 in condition to receive the end-of-line information.

The synchronizing circuit 105 applies a signal over line 107 which resets the computer ready circuit 101 and also triggers the end-of-line gate circuit 108. Thus, when the computer sends out the end-of-line information over line 76, the gate 108 will be actuated by a signal which is applied to it over line 109. The gate 108 applies a signal through a delay circuit 111 to another synchronizing circuit 112 which actuates the control circuit 87. The control circuit 87 actuates the character reset circuit 98 which clears the output devices of the computer and takes the end-of-line information off line 76.

The synchronizing circuit 112 then applies a signal through a 10 microsecond delay circuit 113 to another synchronizing circuit 114. The latter circuit applies a signal over line 116 to the control circuit 94 which actuates the matrix reset circuit 115 causing the matrix to be returned to its reset condition. The control circuit 94 also supplies a signal over line 88 to the computer, but this latter signal is not actually used by the computer in the specific system being described. This completes the cycle of operation of the testing system for a particular testing and sorting operation.

Specific examples of the sections of sub-systems discussed above will be described with reference to FIGS. 4 through 11. It should be understood that these are only examples, and that variations are possible. The circuits for the computer will not be described since this is a commercially available item. Where specific circuit details are not pertinent to the invention, the circuitry is shown in block diagram form.

TEST MODULES

Two representative examples of test modules will be described to show typical circuits for performing a test on a transistor at a particular test station. The test modules provide a D.C. voltage output which is delivered to the encoder 36. This D.C. voltage is proportional (either directly or inversely) to the magnitude of the particular parameter that is being measured at a test station. FIG. 4 shows the circuit of a test module for the measurement of grounded emitter current gain ($h_{fe}$). The transistor 118 under test has its collector connected to terminal 119 of the test module, its base is connected to terminal 120 and its emitter is connected to terminal 121. The D.C. output voltage from the test module appears at terminals 132 and 133, and various standard bias voltages are connected to terminals 124, 125, 126, 128 and 130 as shown. Terminal 127 is always grounded. This arrangement of terminals is the same for all of the test modules of the testing system, although in some instances it is not necessary for all the terminals to be connected to the circuits internal to the test module.

A differential amplifier 136 is provided having input terminals 137 and 138 and having output terminals 139 and 140. Such differential amplifiers are commercially available. When making the $h_{fe}$, or current gain test, both relays 134 and 135 are energized, thereby grounding the amplifier input 138 and connecting the test information output terminal 132 to the base of the transistor 118 under test. The +15 volts at terminal 124 causes 10 microamps of current to flow through resistor 142 and into a summing point 143. Since input terminal 138 of the amplifier is grounded through the contacts of relay 134, input terminal 137 is the active, or above-ground input to the amplifier.

The behavior of the amplifier 136 is such that it will supply a voltage at its output terminals 139 and 140 which will cause the transistor 118 to supply a nulling current through resistor 144 to the summing point 143. Amplifier 136 operates in such a manner that it always produces an output voltage which will cause the current being supplied by the transistor to the summing point 143 to be equal in magnitude and opposite in polarity to a previously established current flowing to this point through resistor 142. In order to provide a 10 microamp nulling current through resistor 144, there must be a drop of .5 volts between the collector 119 and the emitter 121 of the transistor under test. The amplifier 136 provides enough output voltage at terminal 139 to forward bias the base-to-emitter circuit of transistor 118 so that the collector 119 of this transistor will draw 25 ma. of current. This 25 ma. current will flow through resistor 146 causing a 14.5 volt drop across this resistor and leaving a .5 volt drop between terminals 119 and 121 which establishes a 10 microamp nulling current through resistor 144.

For a transistor having an $h_{fe}$ of 10, there would be 2.5 ma. of current flowing through resistor 141 which would be established by a 10 volt output from the amplifier 136. With relays 134 and 135 in the energized condition the test information output terminals 132 and 133 are placed directly across resistor 141 and the voltage drop across this resistor is read. For transistors having current gains ($h_{fe}$) of less than 10, the voltage across resistor 141 would be higher since a higher current into the base terminal 120 for the transistor would be necessary to maintain a 25 ma. collector current. For transistors having comparatively high $h_{fe}$, the voltage drop across resistor 141 would be relatively low indicating that a relatively small base input current is necessary to cause the 25 ma. collector current. For this particular test module, the test voltage produced at the output terminals is inversely proportional to the magnitude of $h_{fe}$.

The circuit of FIG. 4 may be used at several of the test stations of the system in order to measure the grounded emitter current gain ($h_{fe}$) of the transistor at different current and voltage levels. The voltages applied to the terminals of the test module are selected to provide the desired collector current for each test, and those identified in FIG. 4 are suitable for measuring $h_{fe}$ at a collector current of 25 ma. In a particular testing system in accordance with the invention, $h_{fe}$ is measured at collector currents of 1.5, 5, 10, 25 and 100 ma., and thus the testing circuit of FIG. 4 is used at five different test stations to perform these tests.

Each time a transistor is tested, each test module automatically calibrates itself. When the relays 134 and 135 are de-energized, the test module circuit is in the calibration condition. Terminal 137 of the amplifier 136 is grounded and a 1 microamp summing current is established at a calibration summing point 147 due to 15 volts being applied through resistor 148. In this instance the active input terminal to the amplifier 136 is terminal 138. The amplifier establishes a voltage output between terminals 139 and 140 which causes a feedback nulling current of 1 microamp to be established through resistors 141 and 149. This current cancels or nulls out the originally established 1 microamp current flowing in resistor 148, and thus the amplifier 136 stabilizes in its balanced condition. In order to establish a 1 microamp current through resistors 141 and 149, 7½ volts must be produced between the amplifier output terminals 139 and 140. During the calibration step terminals 132 and 133 are connected directly across the amplifier output, and if the test module circuit is performing properly, 7½ volts will be present at these terminals.

This calibration voltage is supplied to the encoder 36 of the system and is converted to digital form just like the test voltage. The calibration voltage will always come within the same voltage range of the analog-to-digital converter 46 unless the test module is not operating properly. A calibration voltage of 7½ volts falls in the seventh range of the converter. If the converter detects a calibration voltage outside the seventh range, the test module will be suspect and should be checked to see if it is operating properly.

A second example of a test module circuit is shown in FIG. 5. This circuit tests the reverse leakage current ($I_{cbo}$) between the collector and base of the transistor 150 under test. In this instance it is desired to test for $I_{cbo}$ at $-6$ volts. The transistor 150 has its collector connected to terminal 152, its base connected to terminal 153 and its emitter connected to terminal 154. The emitter of the transistor is open or "floating." Under test conditions, relay 155 is energized and $-6$ volts is placed between the collector 152 and the base 153 of the transistor. The operation of the differential amplifier 156 is such that when it is in its balanced condition, its active or above-ground input terminal 157 may be considered to be virtually at ground potential. This circuit arrangement causes the reverse leakage current ($I_{cbo}$) of the transistor to flow into the active input terminal 157 of the amplifier 156. The summing point for this circuit arrangement is at 159 and the amplifier will establish a voltage at its output terminals 160 and 158, which will cause a nulling current to be fed back through resistor 161 which is equal in magnitude but opposite in direction to the leakage current of the transistor. Thus, if the leakage current is 5 microamps, an output voltage of 5 volts will be established by the amplifier in order to return 5 microamps through the resistor 161. In other words, the amplifier output will provide 1 volt of output per 1 microamp of $I_{cbo}$. This output voltage is therefor directly proportional to the leakage current and is read at the test information terminals 132 and 133.

The circuit of FIG. 5 may be used at another test station to measure the emitter current ($I_{ebo}$) of the transistor when the emitter junction is reverse biased and the collector is open-circuited. This test is accomplished by reversing the emitter and collector connections of the transistor 150 (FIG. 5) so that the emitter is connected to terminal 152 and the collector is connected to terminal 154. Similarly, by providing a short-circuit between terminals 153 and 154 as shown in FIG. 5, the same basic circuit can be used to measure $I_{ces}$ which is the collector current with the collector junction reverse biased and the base shorted to the emitter.

To calibrate the circuit of FIG. 5, relay 155 is de-energized and 6 volts is established between the collector terminal 152 and ground. This causes 2.85 microamps of current to flow in resistor 162 and thus into the active input terminal 157 of amplifier 156. Since the amplifier is adjusted to provide 1 volt of output for each 1 microamp of input current to its active input terminal, a voltage of 2.85 volts will appear at the amplifier output terminal 160. Thus, under calibrate conditions, a voltage of 2.85 volts will appear at the test information terminals 132 and 133.

ENCODING SECTION

The entire encoder section 36 is shown in FIG. 6 and includes the analog-to-digital converter 46 and the digital-to-binary converter 47. The test voltage produced by a test module between terminals 132 and 133 (FIGS. 4 and 5) is delivered to the analog-to-digital converter 46 over the lines 165 and 166 (FIG. 6). The test voltage is applied to a standard attenuating circuit 167 which is part of the converter 46 and is shown in block form in FIG. 6. This attenuating circuit normalizes the voltage received from the associated test module to a standard over-all voltage range so that this standard range can be applied over line 168 to the digitizing stages 171–177 of the converter 46.

Each of the stages 171–177 has a potentiometer (182, 183, etc.), and each stage has a sensing transistor (178, 179, etc.) whose D.C. bias condition may be controlled by adjusting the associated potentiometer. The base electrodes of the sensing transistors are connected through resistors 180 and 181 to the common input line 168. The sensing transistors are initially non-conducting, and each one is individually biased such that it will turn on only when the voltage on line 168 exceeds a particular level which is determined by the setting of the associated potentiometer. For example, the potentiometers may be adjusted so that the sensing transistors will be turned on successively at one volt intervals. If the voltage appearing on line 168 is in the range of zero to one volt, none of the stages 171–177 will be energized. If the voltage is in the range of one to two volts, only stage 171 will be energized. A voltage of from two to three volts energizes stages 171 and 172, and an additional stage is energized for each additional volt.

The digitizer stages 171–177 are not restricted to the particular mode of operation just referred to. A given stage may be set to respond to any desired level of input voltage within the range that is available on line 168. Thus, the sequence of operation of the stages, and the voltage intervals between the stages, are completely flexible and can be preset as desired by adjusting the potentiometers. In order to illustrate the operation of the encoder, it will be assumed that the potentiometers have been set to make the stages 171–177 respond in numerical order at intervals of one volt.

When transistor 178 turns on, a negative pulse is produced at its collector. This pulse charges capacitor 184 through a forward biased diode 186. The voltage applied to the emitter-base circuit of transistor 178 is transient, so this transistor quickly turns off again. This produces a negative going pulse at the base of transistor 187 turning it on. This in turn produces a positive pulse at the collector of transistor 187 causing transistor 188, which is connected as an emitter follower, to conduct and produce a positive pulse at its emitter. The pulse from transistor 188 is delivered to the base electrodes of transistors 189 and 190 via the capacitors 191 and 192 respectively, turning these transistors off. Transistors 189 and 190 remain off for approximately 10 milliseconds until the charge established on capacitor 191 discharges through resistor 193. This off time produces a negative pulse of 10 millisecond duration which appears on line 196. Line 196 is the input line to the digital-to-binary converter 47.

If a voltage falling within the range of two to three volts appears on input line 168, both stage 171 and 172 will be operated to supply pulses to line 196. Stage 171 will function as previously described and stage 172 will function as follows. The voltage will be sufficient to forward bias transistor 179 and it will turn on and produce a pulse at its collector which will be similar to the pulse previously established when transistor 178 of section 171 turned on. Similarly, capacitor 195 will charge up through the forward biased biode 197 and, when the input voltage is removed, a negative going pulse at the base of transistor 198 will cause it to turn on and produce a pulse at its collector. This pulse is coupled through capacitors 199 and 200 to the bases of transistors 201 and 202 respectively. The latter pulse causes the transistor 201 to turn off and has no effect on transistor 202 which is initially in the off condition. The charge developed on capacitor 199 is discharged through resistor 203 and the RC time constant of these two components determines how long transistor 201 remains off. As soon as the voltage on capacitor 199 decreases to a low enough value, it will no longer hold transistor 201 off and this transistor will conduct again. This produces a negative going pulse through capacitor 200 to the base of transistor 202, causing this transistor to turn on. This produces a pulse of short duration on the collector of transistor 202. The time constant of capacitor 199 in combination with resistor 203 determines the time when transistor 202 will turn on and thus establishes the time when a pulse will be produced at the collector or ouput of transistor 202. This time constant must be adjusted to cause this pulse to be produced at some time after the start of the 10 millisecond pulse which was produced from stage 171.

Stage 171 produces a relatively long duration negative-going pulse lasting for about 10 milliseconds, whereas the stages 172 through 177 produce relatively short duration pulses which occur sequentially. Even in the condition where each of the stages 172–177 is caused to produce a pulse, all of the pulses are produced within the duration of the negative-going 10 millisecond pulse produced by stage 171.

The operation of stages 173 through 177 corresponds to the operation described for stage 172, and it can be seen that the number of pulses produced on line 196, which is the input to the digital-to-binary converter 47, is proportional to the particular range of the test voltage and thus proportional to the magnitude of the test voltage. For a voltage within the range of zero to one volt no pulses would be supplied to line 196. For a test voltage of one to two volts one 10 millisecond negative-going pulse would be applied to line 196. For a voltage within the range of four to five volts, four pulses would be supplied to line 196, and so forth.

The digital-to-binary converter 47 has three main portions. These are the counter section (including block 208 and the circuitry at the left of it), the parity section 225, and the output driver and indicating section which is shown above the parity circuit 225. The counter has three stages. The circuitry of the first stage is shown at the left of block 208, and the second and third stages are represented by block 208. The parity circuitry 225 and the driver and output indication circuitry have been shown in detail. The action of the first stage of the counter circuitry will now be described.

Before any pulses are supplied to the input line 196 leading to the counter circuit, transistor 209 is non-conducting and transistor 210 is conductiing. These two transistors operate as a flip-flop such that when transistor 209 is off, transistor 210 is on and vice versa. If a single pulse appears on the input line 196, it is delivered to the base electrode of transistor 210 through the resistor 211, the forward biased diode 212, and the capacitor 213. This pulse turns the transistor 210 off and causes transistor 209 to turn on. When transistor 209 turns on, transistor 216 turns on and completes a crcuit through the collector-to-emitter portion of transistor 216, and the resistors 215 and 217. This establishes a negative voltage on line 222 and causes transistors 219 and 220 of the driver and output circuit to conduct. When transistors 219 and 220 conduct, line 204 is connected to ground and the indicator light 221 is energized. This indicates an output on line 204.

Referring to Table I, the circuit condition just described is equivalent to a digital count of one. There is a binary one on line 204 which is equivalent to a voltage of zero volts. Lines 205 and 206 receive binary zero outputs which are equivalent to −12 volts.

The operation of the additional stages of the counter circuit which are represented by block 208 causes either a positive voltage or a negative voltage to appear on lines 223 and 224. Any combination of positive or negative voltage may appear on lines 222, 223 and 224, depending upon the binary condition to be generated on the output lines 204, 205 and 206. For example, to have a binary one output on line 206, the transistor 226 must be conducting and this condition is only possible if line 224 has a positive voltage on it as a result of the counter action. Thus, the counter is actuated by the pulses on line 196, and it controls the conduction of the driver transistors 219, 225 and 226. These transistors in turn place either 0 or −12 volts on the binary output lines 204, 205 and 206. In this manner, the count is converted to binary form in accordance with Table I.

The function of the parity circuit 225 is to provide a binary one condition on the parity output line 207, whenever there is an even number of binary one outputs on lines 204, 205, and 206. Stated another way, the parity circuit ensures that the number of binary one outputs supplied to lines 204–207 is always an odd number (i.e., one or three). The lines from the counter circuit which affect the operation of the parity circuits are lines 222, 223, 224, 227, 228 and 229. These lines are connected to different base electrodes of the transistors within the parity circuit. There are two states of the parity circuit. The first state is that in which there is a low resistance conducting path between line 230 and line 231. The second state of the parity circuit is that in which there is an open circuit or no connection between lines 230 and 231.

Transistors 232 and 233 in the output circuitry determine the condition of the parity line 207 and parity light indicator 234 respectively. In situations where the parity circuit 225 does not provide a connection between lines 230 and 231, transistors 232 and 233 will be conducting as a result of the forward bias applied to the bases of these transistors from line 236 which carries −12 volts as applied through resistors 237 and 238. When the transistors of the parity circuit create a shorted path between lines 230 and 231, the forward biasing effect of the −12 volts is removed and the transistors 232 and 233 are turned off by the +12 volts existing on line 239.

Referring to Table I above, for a count of zero (i.e., with no pulses into the counting circuit), there will be a binary zero output on all three of the lines 204, 205 and 206. The parity line 207 should receive a binary one output in this condition in order to provide an odd number (one) of binary one outputs. A binary one output will appear on the parity line 207 if the transistor 232 is conducting. This requires that the parity path between lines 230 and 231 be non-conducting. Any of the transistors within the parity circuit 225 will conduct if its base electrode has negative voltage applied to it through its base resistor. For a digital count of zero, each of the lines 222, 223 and 224 carries positive voltage. Thus, line 222 supplies positive voltage to the base of transistor 242 preventing it from conducting. Line 223 supplies positive voltage to the bases of transistors 245 and 249, preventing them from conducting and line 224 supplies positive voltage to the base of transistor 248 preventing it from conducting. Thus, there is no low resistance path through the parity circuit between lines 230 and 231. With binary zero outputs on lines 204, 205 and 106, the parity line 207 carries a binary one to preserve the rule that there shall always be an odd number of output lines energized with voltage representing binary one.

As a further example of the operation of the parity circuit, consider a count of seven situation. In this condition, transistor 216 of the counter circuit is conducting, thus, placing negative voltage on line 222. This voltage is connected to the base of transistor 242 of the parity circuit through its base resistor causing this transistor to conduct. Similarly, line 223 will carry negative voltage which will be applied to transistors 245 and 249 through their base resistors, turning both of these transistors on. Line 224 will also carry negative voltage which will be applied to the base of transistor 248, causing this transistor to conduct. A conducting path now exists between lines 231 and 230, starting at the emitter of transistor 242 and passing through the emitter-to-collector circuits of the devices 242, 249 and 248. With line 230 shorted to line 231, transistors 232 and 233 will not conduct and a —12 volt output is delivered on the parity output line 207 indicating a binary zero condition.

SCANNING SECTION

The test information is available in binary form on the output lines 204, 205 and 206 of the digital-to-binary converter 47. It should be noted that there are forty such trios of lines, each containing the test information received from a corresponding one of the forty test stations as a result of the last test made. It is necessary to transfer this information into the computer for storage and comparison against the specifications. This function is performed by the scanner 36 which is shown in FIGS. 7 and 8.

Figure 7:
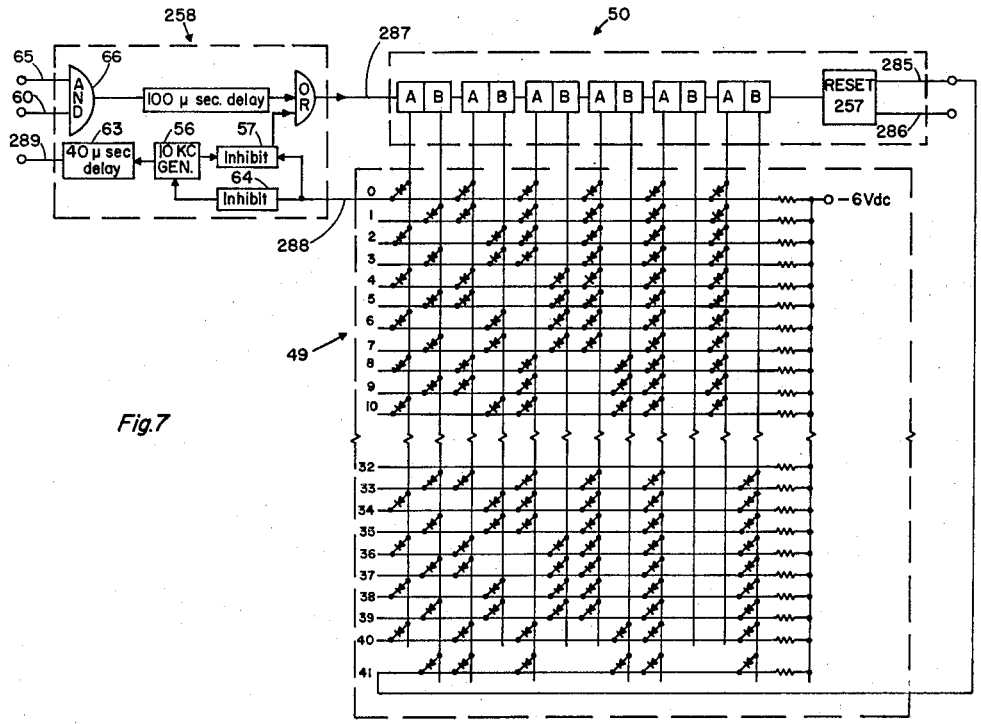
FIG. 7 is a circuit diagram of a matrix portion of a scanner of the test system.
Figure 8:
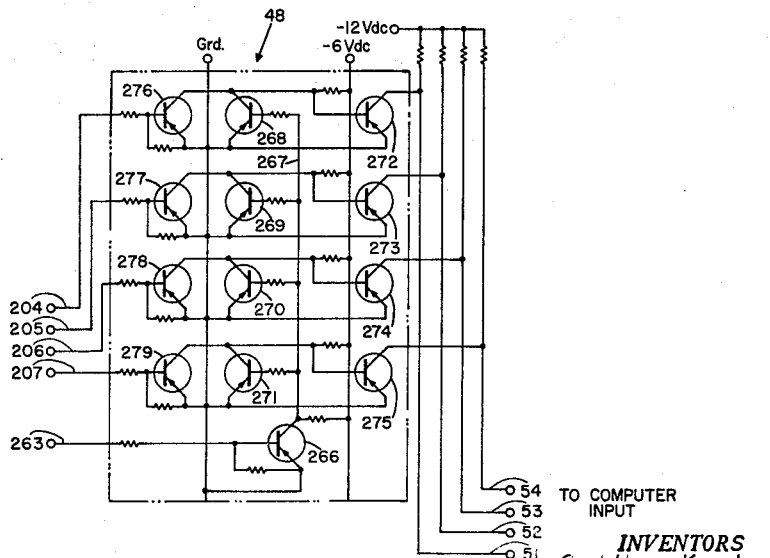
FIG. 8 is a circuit diagram of a gate included in the scanner.

The scanner is composed of forty gate circuits 48 (FIG. 8), the matrix 49, the matrix counter 50 and the counter driving circuit 258 (FIG. 7). Referring first to the gate circuit 48 shown in FIG. 8, when the gate input line 263 is energized with —6 volts from the matrix 49 transistor 266 is caused to conduct. This places line 267 at ground potential and causes transistors 268, 269, 270 and 271, which normally are conducting under non-scanning conditions, to turn off. When these transistors were on, they shorted the base-to-emitter circuits of each of transistors 272, 273, 274 and 275 causing them to be non-conducting. When transistors 268 through 271 turn off, the bases of transistors 272 through 275 become forward biased as a result of —6 volts being applied to their bases. For transistors 272 through 275 to turn on it is also necessary that transistors 276 through 279 be non-conducting since the latter also shunt the base-to-emitter circuit of transistors 272 through 275.

If, for example, a binary one condition existed on line 204, this would mean that there is zero volts on this line. The zero volt input would cause transistor 276 to be non-conducting, and when transistor 268 is turned off by the gating voltage applied to input line 263 from the matrix 49, the base-to-emitter circuit of transistor 272 is not shorted and transistor 272 conducts. This puts line 51 at ground potential which is equivalent to the binary one condition. Thus, this particular portion of the scanning circuit has transferred the binary one information from line 204 through to line 51 and has presented it to the computer input.

The placing of the test information on each of the computer input lines occurs at the same instant of time for any given scanning cycle. Following the transfer of the binary information from lines 204 through 207 to the computer input lines 51 through 54, the remaining thirty-nine scanner gate circuits sequentially transfer the binary test information into the computer as a result of the sequential application of gate voltages applied from the matrix 49 of FIG. 7 to each of the gate input lines such as 263.

The matrix 49 has forty-two output lines, and these are numbered 0 to 41 consecutively in FIG. 7 in order to clarify the description. The lines corresponding to numbers 11 through 31 are not shown in FIG. 7 since the operaton of the circuit can be explained by considering only those lines which are shown. The matrix output lines 1–40 are connected to the corresponding gate circuits 48. For instance, output line 1 of the matrix connects to the input line 263 of the first gate circuit, the output line number 2 is connected to a second scanner gate, and so forth. The matrix line number 0 is connected to the inhibit circuit 64, and the matrix line number 41 is connected to line 285 leading to the reset circuit 257.

To initiate a scanning cycle it is necessary for a signal to be received at each of the inputs 60 and 65 for the AND gate 66 of the counter driver circuit 258. A signal on line 60 indicates that a test has been made on all forty transistors and is called a "test complete" signal. A signal on line 65 indicates that the computer is ready to receive the test information from the scanner. As discussed previously, the clock pulse generator 56 runs at a 10 kc. rate. When these clock pulses are delivered to the counter input line 287 of the counter circuit 50, the counter will operate. Since this counting circuit is a standard circuit which is well known in the art, it is shown in block diagram form. The counter output lines operate in conjunction with the matrix 49 in such a manner that only a single matrix output line will have —6 volts on it at any given time. In the reset condition of the counter 50, the matrix line number 0 has —6 volts on it. The rectifiers of the matrix are connected so that when the counter starts its cycle of operation, one matrix output line at a time is energized with —6 volts starting with line 1 and finishing with line 41. This causes each of the forty gate circuits 48 to operate sequentially to transfer the voltages from the forty encoder stages to the computer. As previously mentioned, line 41 of the matrix is connected to the input line 285 for the reset circuit 257. When —6 volts appears on line 41, this voltage actuates the reset circuit which in turn returns the entire counter circuit to the reset condition. At this time the circuit 257 sends out an end-of-line pulse on line 286 to the computer which indicates to the computer that all forty sets of test information have been transferred to it.

DECODING SECTION

Figure 9:
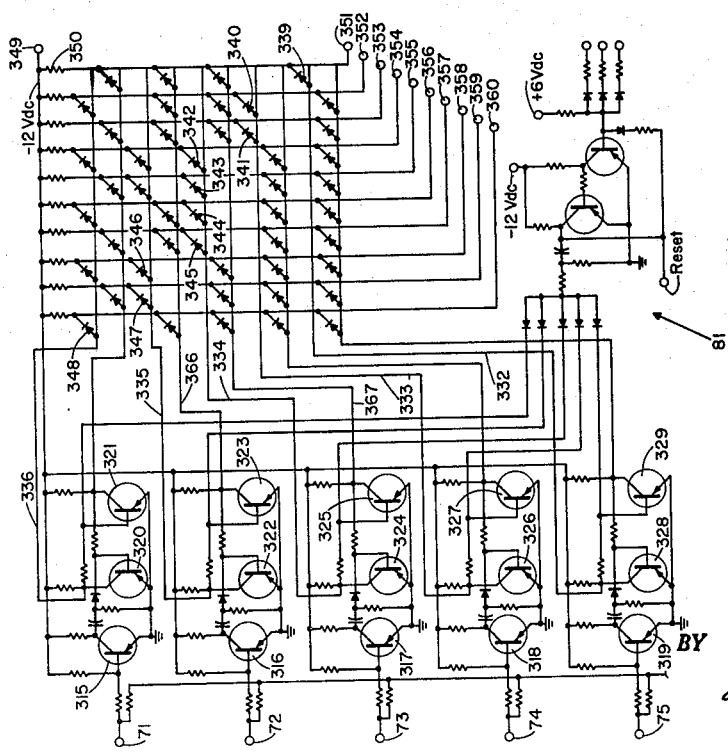
FIG. 9 shows a decoder for converting the binary information supplied from the computer to digital form.

The operation of the decoder 39 and the way it handles the binary classification information from the computer will now be described referring primarily to FIG. 9. The binary information from the computer is supplied on lines 71–75 to the decoding matrix 81 of FIG. 9. Since the computer is delivering information which indicates the particular specification that a device will meet, the binary information thus represents one of forty digital classifications numbered from 0 to 39. Table II above indicates the relationship between the binary information and its equivalent digital value. A binary one output is equivalent to zero volts on the output lines 71–75 and a binary zero is equivalent to +48 volts.

The voltage on lines 71–75 affects the state of conduction or non-conduction of the string of input transistors 315 through 319 of the decoder matrix 81. The state of conduction or non-conduction of these transistors determines the condition of the flip-flop transistor pairs 320 through 329. When the flip-flops 320 to 329 are in the reset condition, and assuming there is no output on any of the lines 71 through 75, the left hand flip-flop transistors 320, 322, 324, 326 and 328 are conducting. This grounds lines 332, 333, 334, 335 and 336 causing the rectifiers 339 through 348 to have their lower ends connected to ground. The −12 volts on line 349 biases these rectifiers in the forward direction through the resistors, such as 350, and the rectifiers conduct and place all of the digital output lines 351 through 360 at ground potential.

Assume, for example, that a binary output representing the digit 6 is supplied to lines 71 through 75 by the computer. This would mean that line 71 would have +48 volts, line 72 would have zero volts, line 73 would have zero volts, line 74 would have +48 volts, and line 75 would have +48 volts. Transistors 320, 326 and 328 are conducting and therefore lines 332, 333 and 336 are held at ground potential. Lines 351 and 352 also are at ground potential. Since lines 72 and 73 are grounded, the transistors 316 and 317 are caused to conduct as a result of the −12 volt bias on line 349. When transistor 316 conducts, the flip-flop transistors 322 and 323 change their states. In other words, transistor 322 becomes non-conducting and transistor 323 conducts. This same situation occurs in flip-flop transistors 324 and 325; that is, 324 shuts off and 325 conducts. Since transistors 323 and 325 are now conducting, lines 366 and 367 are connected to ground. The grounding of line 366 connects the output line 357 to ground. The grounding of line 367 connects the output line 359 to ground. The only output line which is not grounded is line 355 and this corresponds to a digital 6 output. Other combinations of binary inputs to the decoder matrix will produce a different digit output, but the reasoning will be similar to that just described. Only one digit is delivered by the computer at a time and therefore only one of the digital output lines 351 through 360 will have an output at any given time. The classification of a transistor is indicated by a two digit number with the first digit appearing first and the second digit being delivered immediately afterward.

SORTING SECTION

Figure 10:
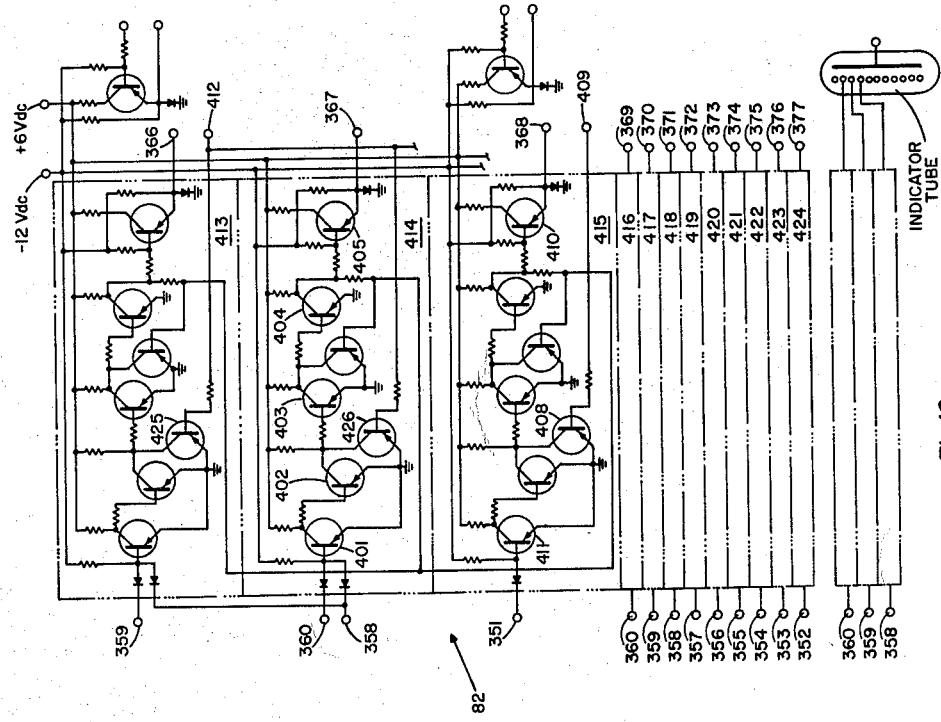
FIG. 10 illustrates the circuits which receive the digital information and control the sorting of transistors.
Figure 11:
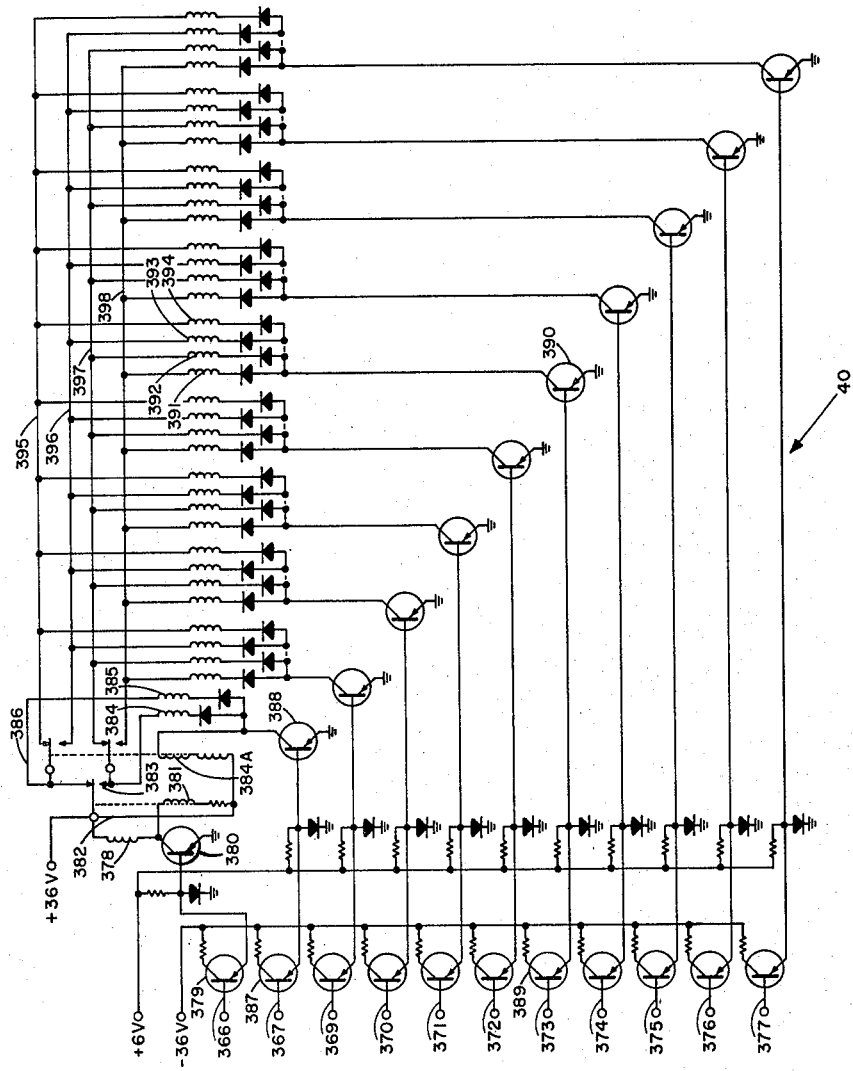
FIG. 11 shows the sorting driver circuits and the sorting solenoids.

The numerical classification of the transistor under test has now been converted to digital form, and it is necessary to utilize this digital classification information to obtain proper sorting of the device into the sorting bin which represents that classification. The sorter 40 has a total of forty bins. These bins are divided into four sections 31–34 (FIG. 1) with ten bins in each section. The purpose of the sorter circuit of FIGS. 10 and 11 is to cause the solenoids within the sorter to direct a device into the bin which represents the classification of that device. The sorter solenoids are associated with three levels of sorting. The first level solenoid determines into which pair of sections a device will be directed, the second level solenoids determine into which section of a particular pair of sections the device will be directed, and the third level solenoids determine the particular bin within a section into which the device will be placed.

The input lines to the digit detector circuit 82 are shown at 366 through 377 in FIG. 10. Referring to FIG. 1, sections 31 and 32 will be identified as the left hand sections and sections 33 and 34 will be identified as the right hand sections for purposes of describing the operation of the digit detectors and the sorting circuitry. Devices having a classification number whose first digit is a zero or a one are directed into one of the left hand sections. Devices having a classification number whose first digit is either a 2 or a 3 are sorted into one of the right hand sections. The condition of the first level solenoid 378 (FIG. 1) determines whether a device will be diverted to the left hand or the right hand sections. For instance, in situations where the first level driver stage 413 of the digit detector circuit 82 (FIG. 10) produces an output on line 366, this indicates that the first digit of the classification is either a two or a three. Transistor 379, which is in the first level portion of the sorter circuit (FIG. 11), will conduct, thus biasing transistor 380 in the forward direction causing it to conduct, and placing the lower end of the first level solenoid 378 at ground causing actuation of the first level. The arm of the first level solenoid 378 (FIG. 1) is shown thrown to the left which causes the device to be diverted to the right hand sections 33 and 34. The conduction of transistor 380 (FIG. 11) also causes the coil 381 to be energized and this connects line 382 to line 383. This puts 36 volts on line 383.

In order to determine into which one of the sections of the two right hand sections the device will be directed, the second level solenoids 384 and 385 must be considered. If the first digit of the device classification number is a three, there will be an output on line 367 of the second level digit detector 414 of FIG. 10. This will cause transistors 387 and 388 of the sorter circuit (FIG. 11) to conduct. This places the lower ends of the second level solenoid coils 384 and 385 at ground potential. The action of the contacts of the solenoid 381 had previously caused 36 volts to be applied to line 383 simultaneously removing this voltage from line 386. Thus, solenoid 384 will be energized and this will cause the device to be directed into section 34 which is the section for devices having categories from 30 to 39. The arm of solenoid 384 (FIG. 1) is shown diverting the device into section 34. If the first digit had been a two, no output would have appeared on line 367 (FIG. 11) and solenoid 384 would not have been energized and the device would have been directed into section 33 which is for devices whose classification number starts with a two.

The action of the sorter circuit in directing transistors to particular bins has been described for devices having a classification number starting with a two or a three. In instances where the first digit of the device number is a zero or a one there is no output on line 366 and neither transistor 379 nor 380 will conduct. Neither the first level solenoid coil 378 nor the coil 381 will be energized. Since coil 378 is not energized the arm of this coil (FIG. 1) will be thrown to the right and devices will be directed into sections 31 and 32 which are for devices whose number starts with a zero or a one. If the number starts with a zero, the second level solenoid coil 385 (FIG. 11) will not be conducting because its lower end is not grounded through transistor 388. The arm of coil 385 (FIG. 1) will be thrown to the right and the devices will be directed to section 31. If the number starts with a one, there will be an output on line 367 (FIG. 11) and transistors 387 and 388 will conduct. This grounds the lower end of coil 385, the arm of coil 385 is thrown to the left and the device is put into section 32.

It is also necessary to establish the correct condition of the third level solenoid coils in order to direct the transistor to the proper bin within a particular section. For instance, assuming that the device classification was 35, the first and second level solenoids would operate as previously described and there would also be an output on line 373 which would cause transistors 389 and 390 to conduct. This places the lower ends of the third level solenoid coils 391 through 394 at ground potential. There will be no voltage on lines 395, 396 and 397 because of the action of solenoid coils 381, 384 and 384a, but there will be 36 volts on line 398 and solenoid coil 391 will be energized. This will cause the transistor to be directed into the number five bin of section 34. Devices can be sorted into any one of the forty different bins and this sorting is done on the basis of the device classification number. This number determines the condition of conduction or non-conduction of the input transistors of the sorter circuit of FIG. 11 such as 366 through 377 and the condition of these transistors determines the routing action of the first, second and third level solenoids.

The state of conduction or non-conduction of sorter circuit input transistors 366 through 377 is determined by the condition of the individual levels or stages 413–424 of digit detector circuit 82 of FIG. 10 which bias these transistors. The digit detector stages in turn respond to the digits which are delivered on lines 351 through 360. Digits are delivered through the test system in sequence. That is, the first digit of the classification number will come through first, followed immediately by the second digit. Only one digit is processed at one instant of time. It will be assumed that the first digit of the number is available on one of the output lines 351 through 360. Suppose that this digit is a one. There will be no output on lines 351 through 359 but line 360 will have an output represented by a −12 volt potential. This −12 volts turns transistor 401 of the second level detector stage 414 on. This, in turn, turns transistor 402 off, turning transistor 403 on, transistor 404 off and transistor 405 on. With transistor 405 conducting, −12 volts exists on line 367. This turns on transistors 387 and 388 of the sorter solenoid circuit 40 (FIG. 11) and causes the second level solenoid coils 384 and 385 to assume states as previously described.

The −12 volts applied to line 360 is also delivered to the input of stage 416 of the third level detector stages 415–424 of the digit detector circuit 82. While the first digit information is being processed, it is desired to prevent this information from actuating any of the circuits having to do with the third level sorting since the latter have to do with the second digit of the classification number only. During the processing of the first digit information each of the transistors such as 408 of stage 417 in all of the third level detector stages 415 through 424 are made to conduct by a −6 volt bias applied to line 409. This is a forward bias and it prevents each of the output transistors such as 410 from conducting, even though an input transistor such as transistor 411 may be conducting as a result of an input being present. In this manner all of the third level detector stages are prevented from producing an output even under conditions where their inputs are energized. This action results from the operation of the second digit gate 96 (FIG. 3) which is timed to maintain the −6 volts on line 409 during the time the first digit information is being processed. After the first digit information has been processed the first digit gate 86 (FIG. 3) applies a signal over line 89 to the control circuit 87 which tells the computer to remove the first digit of the classification information from the memory section of the computer. The control circuit 87 also actuates the character reset circuit 98 which clears the output lines of the computer which feed lines 71 through 75. When the second digit information is ready to be received the first digit gate 86 applies a negative bias to line 412 (FIG. 10) and this turns off transistors 425 and 426 of the first and second level detector stages respectively, and prevents an output from being delivered from either of these stages, even though their inputs may be energized. Thus, the first and second level detector stages 413 and 414 are prevented from having an output during the time when the second digit information is being processed.

Summarizing briefly, the invention provides a testing and sorting system which is fast, flexible and reliable. The system can be expanded to handle additional testing lines. The specifications to which tests are made can be changed conveniently, and the priorities of those specifications can also be changed. The system provides ample data to enable very close control over the production line where the transistors are fabricated. The system has many advantages compared to testing equipment available previously. Alternatives to some of the specific circuits described above are available, and the illustrated circuits have been presented by way of example.

We claim:
1. An electrical system for making a series of different electrical tests on electronic devices which are supplied automatically to a plurality of test stations in a serial order, and for ultimately sorting the devices on the basis of their electrical parameters as measured at said test stations, said electrical system including in combination:
   (a) a plurality of testing circuit means, one for each of said test stations, for performing a series of different voltage-current tests on each of said electronic devices on the basis of one test at each said test station so that a plurality of test output signals representing measured values of the parameters of each said device are supplied sequentially from said testing circuit means,
   (b) means for evaluating said test output signals from said testing circuit means including a computer for storing the individual test output signals for a given device until the series of tests for that device is completed by said testing circuit means, and for then comparing the measured parameter values represented by said test output signals on a priority basis against parameter limits for a plurality of electrical categories so as to classify such device into the highest priority category that is satisfied by the parameters of said device as measured by said testing circuit means,
   (c) and means controlled electrically by said computer for receiving said devices from said test stations and for automatically sorting said devices into a plurality of groups corresponding to the electrical categories into which said devices have been classified by said computer.

2. An electrical system for making a series of different electrical tests on transistors which are moved automatically in serial order to each of a series of test stations associated with said system, and for ultimately sorting the transistors into receptacles on the basis of their electrical parameters as measured at said test stations, said electrical system including in combination:
   (a) a plurality of testing circuit means, one for each of said test stations, for applying predetermined combinations of test voltages and currents to each of said transistors to perform a different electrical test on each such transistor at each such test station, so that a plurality of test output signals representing measured values of the parameters of any given transistor are supplied sequentially from said testing circuit means as such transistor progresses through said series of test stations,
   (b) means for evaluating said test output signals from said testing circuit means including an electronic computer for storing the test output signals for a given transistor until the series of tests for that transistor is completed by said testing circuit means,
   (c) said computer having signals representing parameter limits for a plurality of electrical categories for said transistors stored therein, and being programmed to compare the measured parameter values represented by a set of test output signals for a given transistor with said stored parameter limits on a priority basis to thereby classify such transistor into the highest priority category that is satisfied by the parameters of said transistor as measured by said testing circuit means,
   (d) and electrical sorting means controlled electrically by said computer for automatically directing each said transistor as received from said test stations into one of said receptacles corresponding to the electrical category into which that transistor has been classified by said computer.

3. An electrical system for making a series of different electrical tests on transistors which are supplied automatically in serial order to each of a plurality of test stations associated with said system, and for ultimately sorting the transistors on the basis of their electrical parameters as measured at said test stations, said electrical system including in combination:

(a) a plurality of testing circuit means, one for each of said test stations, for simultaneously performing a plurality of different voltage-current tests on transistors located respectively at said test stations at a given time, so that as said transistors progress from one test station to another each said testing circuit means supplies a test signal representing a measured value of the parameter tested thereby, (b) circuit means for encoding said test signals from said testing circuit means into binary coded form, (c) scanning circuit means for transferring said encoded test signals from said encoding circuit means in a sequential order, (d) an electronic computer of the binary type for receiving said encoded test signals sequentially from said scanning circuit means and for storing therein individual encoded test signals for a given transistor until the series of tests for that transistor is completed by said testing circuit means, (e) said computer having parameter limits for a plurality of electrical categories for said transistors stored therein in electrical form and being programmed to compare the measured parameter values represented by a set of encoded test signals for a given transistor with said stored parameter limits on a priority basis to thereby classify such transistor into the highest priority category that is satisfied by the parameters of said transistor, (f) and means controlled electrically by said computer including sorter circuit means for automatically sorting said transistors into a plurality of groups corresponding to the electrical categories into which said transistors have been classified by said computer.

4. An electrical system for making a series of different electrical tests on electronic devices which are supplied automatically in serial order to each of a plurality of test stations associated with said system, and for ultimately sorting the devices on the basis of their electrical parameters as measured at said test stations, said electrical system including in combination:

(a) a plurality of testing circuit means, one for each of said test stations, for simultaneously performing a plurality of different voltage-current tests on electronic devices located respectively at said test stations at a given time on the basis of one test at each station, with each of said testing circuit means being adapted to supply an output test signal representing a measured value of the parameter tested thereby, (b) circuit means for converting said test signals from said testing circuit means into binary coded form and for supplying said coded test signals therefrom in a sequential order, (c) a computer of the binary type for receiving the coded test signals sequentially from said converting means and storing individual coded test signals for a given device until the series of tests for that device is completed by said testing circuit means, (d) said computer being programmed to compare the measured parameter values represented by said coded test signals on a priority basis with parameter limits for a plurality of electrical categories stored electrically therein so as to supply binary coded output signals representing the highest priority category that is satisfied by the parameters of said device as measured by said testing circuit means, (e) decoding circuit means for converting said binary coded output signals from said computer into decimal coded form, (f) and sorting circuit means responsive to said decimal coded output signals for sorting said devices into a plurality of groups corresponding to the electrical categories into which said devices have been classified by said computer.

5. An electrical system for making a series of different electrical tests on transistors which are supplied automatically in serial order to each of a plurality of test stations associated with said system, and for ultimately sorting the transistors on the basis of their electrical parameters as measured at said test stations, said electrical system including in combination:

(a) a plurality of testing circuit means, one for each of said test stations, for simultaneously performing a plurality of different voltage-current tests on transistors located respectively at said test stations at a given time, with each of said testing circuit means being adapted to supply a test signal representing a measured value of the parameter tested thereby, (b) encoding circuit means for digitizing said test signals from said testing circuit means and for encoding such signals in accordance with a binary code, (c) an electronic computer of the binary type for storing therein individual binary coded test signals for a given transistor until the series of tests for that transistor is completed by said testing circuit means, (d) scanning circuit means for transferring said binary coded test signals from said encoding circuit means to said computer in a sequential order, (e) said computer having parameter limits for a plurality of electrical categories for said transistors stored therein in electrical form and being operative to compare the measured parameter values represented by a set of binary coded test signals for a given transistor with said stored parameter limits on a priority basis to supply for each transistor a binary coded classification signal representing the highest priority category that is satisfied by the parameters of said transistor, (f) circuit means for decoding said binary coded classification signals, (g) and sorting circuit means responsive to the decoded classification signals supplied from said decoding circuit means for automatically sorting said transistors into a plurality of groups corresponding to the electrical categories into which said transistors have been classified by said computer.

6. An electrical system for performing a series of electrical tests on electronic devices which are supplied automatically in serial order to a plurality of test stations associated with said system, and for ultimately sorting the devices into receptacles representing standard electrical categories for said devices having a predetermined order of priority, said electrical system including in combination:

(a) a plurality of testing circuit means for said test stations and adapted to perform a series of voltage-current tests on each of said electronic devices on the basis of one test at each of said test stations, (b) means for converting the output voltages and currents from said devices at said test stations to binary coded test signals representing values of the parameters of said devices as measured by said testing circuit means, (c) an electronic computer of the binary type for storing therein individual binary coded test signals for a given transistor until the series of tests for that transistor is completed by said testing circuit means, and for then classifying such device on a priority basis into one of said standard electrical categories that is satisfied by the measured parameter values of such device and which has the highest priority of said standard categories, (d) said computer being adapted to store therein in electrical form parameter limits for a plurality of standard electrical categories for said transistors and to store in electrical form additional parameter limits for potential electrical categories for said transistors, (e) and said computer being operative to compare the measured parameter values for a given transistor represented by binary coded signals received thereby from said converting circuit means with said stored parameter limits in the order of their priority to accomplish the classification of such transistor into said highest priority standard category satisfied thereby and to further provide output data from which yields of said transistors as compared to said potential categories are determinable, (f) and electrical sorting means controlled electrically by said computer for automatically directing each said transistor as received from said test stations into one of said receptacles corresponding to the standard electrical category into which that transistor has been classified by said computer.

7. An electrical system for performing a series of electrical tests on transistors which are supplied automatically in successive order to each of a plurality of test stations associated with said system, and for ultimately sorting the transistors on the basis of their electrical parameters as measured at said test station, said electrical system including in combination:

(a) a plurality of testing circuit means, one for each of said test stations, for applying predetermined combinations of test voltages and currents to each of said transistors to provide test output signals from said testing circuit means representing measured values of the parameters of said transistors tested thereby, (b) means receiving said test output signals from said testing circuit means including a computer for storing the test output signals for a given transistor until the series of tests for that transistor is completed by said testing circuit means, (c) said computer having parameter limits for a plurality of standard electrical categories for said transistors stored in electrical form therein and being programmed to compare the signals representing measured parameter values received thereby for a given transistor with said stored parameter limits in a predetermined order of priority to thereby classify such transistor into the highest priority category that is satisfied by the parameters thereof, (d) said computer further having parameter limits for a plurality of potential electrical categories for said transistors stored therein in electrical form and being programmed to compare the signals representing measured parameter values received thereby for a given transistor with said stored parameter limits of said potential categories to thereby provide a data output from which the number of said transistors satisfying each of said potential categories is determinable, (e) and electrical sorting means controlled electrically by said computer for automatically sorting said transistors into a plurality of groups corresponding to the standard electrical categories into which said transistors have been classified by said computer.

8. The system of claim 2 in which said receptacles are divided into two sections and said sections are divided into two groups each, and in which said computer means is programmed to provide a composite classification signal for each transistor classified thereby, which signal represents a two digit number identifying the electrical category of such transistor, and said sorting circuit means includes means responsive to the first digit information of said classification signal to sort the corresponding transistor into a selected one of said sections and into a selected group thereof, and further includes means responsive to the second digit information of said classification signal to sort such transistor into one of the receptacles of said selected group.

9. The system of claim 5 in which said encoding circuit means includes a plurality of converter stages having a common output portion and each having pulse generating circuit means responsive at a selected level of a test signal supplied thereto so that said stages provide a series of pulse signals at said common output portion proportional in the number of such pulses to the level of said test signal, means coupled to said common output portion of said converter stages including binary counter circuit means for counting said pulse signals, and output circuit means controlled by said counter circuit means for providing test output signals in binary coded form representing the count of said counter circuit means.

10. The system of claim 1 in which at least one of said testing circuit means includes differential summing amplifier means having an input portion and an output portion, a first direct current circuit for supplying current of one polarity to said input portion of said amplifier means, a second direct current circuit for supplying current of the opposite polarity to said input portion of said amplifier means, means for connecting a transistor to be tested to one of said direct current circuits so that said transistor controls the level of current in such circuit to establish a balanced condition of current at said input portion of said amplifier means, and a test output circuit coupled to said output portion of said amplifier means for providing a test signal at a level proportional to a selected parameter of said transistor.

11. The system of claim 1 in which at least one of said testing circuit means includes differential summing amplifier means having an input portion and an output portion, a first direct current circuit for supplying a standard reference current of one polarity to said input portion of said amplifier means, a second direct current circuit for supplying a nulling current of opposite polarity to said input portion of said amplifier means, means for connecting the emitter-collector circuit of a transistor to be tested to said second direct current circuit so that said transistor controls said nulling current, means for connecting said output portion of said amplifier means to the emitter-base circuit of said transistor for supplying operating potential to said transistor to establish said nulling current at a level which balances said reference current at said input portion, a test output circuit, and means for connecting said test output circuit to said output portion of said amplifier means for supplying at said test output circuit a test output signal of a level proportional to the gain exhibited by said transistor.

12. An electrical system for making a series of different electrical tests on electronic devices which are supplied automatically to a plurality of test stations in a serial order, and for ultimately sorting the devices on the basis of their electrical parameters as measured at said test stations, said electrical system including in combination:

(a) a plurality of testing circuit means, one for each of said test stations, for performing a series of different voltage-current tests on each of said electronic devices on the basis of one test at each said test station so that a plurality of test signals representing measured values of the parameters of each said device are supplied sequentially from said testing circuit means, (b) quantizing circuit means associated with each testing circuit including a plurality of stages responsive at different levels of a test signal corresponding to a series of electrical ranges which span the expected distribution of the parameter so as to provide a test output signal representing the particular range of the tested parameter of a device, (c) computing circuit means for storing the individual test output signals for a given device until the series of tests for that device is completed by said testing circuit means, and for then comparing the measured parameter values represented by said test output signals on a priority basis against parameter limits for a plurality of electrical categories so as to classify such device into the highest priority category that is satisfied by the parameters of said device as measured by said testing circuit means, (d) and means controlled electrically by said computing circuit means for receiving said devices from said test stations and for automatically sorting said devices into a plurality of groups corresponding to the electrical categories into which said devices have been classified by said computing circuit means.

References Cited in the file of this patent

UNITED STATES PATENTS

| | | |
|---|---|---|
| 2,963,652 | Taylor et al. | Dec. 6, 1960 |
| 2,970,260 | Flint | Jan. 31, 1961 |
| 2,977,535 | O'Connor et al. | Mar. 28, 1961 |
| 2,996,666 | Baker | Aug. 15, 1961 |
| 3,032,191 | Clukey | May 1, 1962 |